United States Patent
Allen et al.

(10) Patent No.: US 9,092,276 B2
(45) Date of Patent: *Jul. 28, 2015

(54) NATURAL LANGUAGE ACCESS TO APPLICATION PROGRAMMING INTERFACES

(71) Applicant: International Business Machines Corporation, Armonk, NY (US)

(72) Inventors: Corville O. Allen, Durham, NC (US); Adrian X. Rodriguez, Research Triangle Park, NC (US); Richard A. Salmon, Durham, NC (US); Eric Woods, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/585,649

(22) Filed: Dec. 30, 2014

(65) Prior Publication Data

US 2015/0169385 A1 Jun. 18, 2015

Related U.S. Application Data

(63) Continuation of application No. 14/109,527, filed on Dec. 17, 2013.

(51) Int. Cl.
| | | |
|---|---|---|
| *G06F 3/00* | (2006.01) | |
| *G06F 9/44* | (2006.01) | |
| *G06F 9/46* | (2006.01) | |
| *G06F 13/00* | (2006.01) | |
| *G06F 9/54* | (2006.01) | |

(52) U.S. Cl.
CPC . *G06F 9/54* (2013.01); *G06F 9/466* (2013.01)

(58) Field of Classification Search
None
See application file for complete search history.

(56) References Cited

U.S. PATENT DOCUMENTS

| 7,024,363 B1 | 4/2006 | Comerford et al. |
|---|---|---|
| 7,058,567 B2 | 6/2006 | Ait-Mokhtar et al. |

(Continued)

FOREIGN PATENT DOCUMENTS

| WO | WO2009021198 | 12/2009 |
|---|---|---|

OTHER PUBLICATIONS

Cavage, M, et al., "HTTP Signatures", draft IETF document, Nov. 5, 2013.

(Continued)

*Primary Examiner* — Craig Dorais
(74) *Attorney, Agent, or Firm* — Robert H. Frantz; Jeffrey S. LaBaw (57) ABSTRACT

Users of online services may avoid having to gain knowledge of the intricacies of specific Application Programming Interface (API) syntaxes and elements by using natural language requests which are processed to extract components of the request. The components are then used to find one or more matches of known APIs, and then at least one structured API call is constructed by mapping the request's components to the structured API call's elements. The system can then invoke the online service on behalf of the client, and return the results to the client, or it can return the constructed structured API call to the client. The known API details can be initialized and updated by ingesting the description documents for the structured APIs, and then using natural language processing to extract components from the descriptions, which can then be utilized in the matching process to further enhance the results of the tool.

15 Claims, 4 Drawing Sheets

(56) References Cited

U.S. PATENT DOCUMENTS

| | | | |
|---|---|---|---|
| 7,849,048 | B2 | 12/2010 | Langseth et al. |
| 7,962,470 | B2 | 6/2011 | Degenkolb et al. |
| 8,156,101 | B2 | 4/2012 | Indeck et al. |
| 8,694,305 | B1 * | 4/2014 | Grove et al. .............. 704/9 |
| 2005/0289124 | A1 | 12/2005 | Kaiser et al. |
| 2006/0053133 | A1 | 3/2006 | Parkinson |
| 2007/0203893 | A1 | 8/2007 | Krinsky et al. |
| 2010/0070360 | A1 | 3/2010 | Gilbert et al. |
| 2011/0270607 | A1 | 11/2011 | Zuev |
| 2013/0218914 | A1 | 8/2013 | Stavrianou |
| 2014/0075546 | A1 * | 3/2014 | Zeng et al. ............... 726/17 |

OTHER PUBLICATIONS

Stack Overflow; "HTTP Request signature without session", retrieved on Dec. 10, 2013, from http://stackoverflow.com/questions/4513335.

Allen, James F., et al., "Deep Semantic Analysis of Text", retrieved on Oct. 27, 2012 from http://aclweb.org/anthology-new/W/W08/W08-2227.pdf.

Wikipedia; "Smith-Waterman algorithm"; retrieved from http://en.wikipedia.org/wiki/Smith-Waterman_algorithm on Feb. 5, 2013.

Declerk, T., et al.; "Linguistic and Semantic Representation of the Thompson's Motif-Index and Folk-Literature"; Retrieved on Aug. 28, 2013 from http://link.springer.com/chapter/10.1007/978-3-642-24469-8_17.

Ait-Mokhtar; "Robustness beyond Shallowness:Incremental Deep Parsing"; Retrieved on Aug. 28, 2013 from http://pageperso.lif.univ-mrs.fr/~edouard.thiel/RESP/Semi/2006/ROUX/idp.pdf.

McCarty, L. Thorne, "Deep Semantic Interpretations of Legal Texts",retrieved on Nov. 27, 2012 from http://remus.rutgers.edu/cs440/icail07-acm.pdf.

Maggiani, R.; "Method for Customizing Queries Based on User Preferences for Searching Online Content and Returning Customized Results"; published by IP.com, Feb. 10, 2009.

Ferrucci, D.; "Building Watson; An Overview of the DeepQA Project"; retrieved on Nov. 11, 2011 from http://www.stanford.edu/class/cs124/AIMagzine-DeepQA.pdf.

IBM; "High Throughput Computing on IBM's Blue Gene/P".

IBMResearch; "DeepQA Project FAQ's"; retrieved on Sep. 13, 2011 from http://www.research.ibm.com/deepqa/faq.shtml.

IBM; "IBM System Blue Gene/P Solution".

USPTO; Notice of Allowance from U.S. Appl. No. 14/109,527, mailed on Dec. 12, 2014.

* cited by examiner

NATURAL LANGUAGE ACCESS TO APPLICATION PROGRAMMING INTERFACES

CROSS-REFERENCE TO RELATED APPLICATIONS (CLAIMING BENEFIT UNDER 35 U.S.C. 120)

This is a continuation of U.S. application Ser. No. 14/109,527, filed on Dec. 17, 2013 by Corville O. Allen, et al., and currently under Notice of Allowance.

INCORPORATION BY REFERENCE

The related U.S. application Ser. No. 14/109,527, filed on Dec. 17, 2013 by Corville O. Allen, et al., is incorporated by reference in its entirety including drawings.

FEDERALLY SPONSORED RESEARCH AND DEVELOPMENT STATEMENT

None.

MICROFICHE APPENDIX

Not applicable.

FIELD OF THE INVENTION

This is a continuation of U.S. application Ser. No. 14/109,527, filed on Dec. 17, 2013 by Corville O. Allen, et al., and currently under Notice of Allowance. This invention relates generally to methods and processes for programming computers and designing program code, and particularly to systems and methods which allow for such work to be performed in a natural language format.

BACKGROUND OF INVENTION

An Application Programming Interface (API singular, APIs plural) refers the method or procedure by which one computer program can use the functionality of another program, or by which a user and request (invoke) execution of a service according to his or her wishes. For example, a spreadsheet application program running on a personal computer may need to access a database program in order to retrieve certain data from it. In order to do so, the spreadsheet program must be programmed in a manner which allows it to invoke or "call" the database program, which would include a variety of control parameters (e.g., "arguments") which indicate to the database program what information is requested by the spreadsheet program. These control parameters may include the database file name, if known, and search or filter parameters, for example, a range of customer names, transaction dates, transaction amounts, etc. In another context, a user may wish to update his or her "status" statement on a social networking web account, so the user may have to operate a sequence of functions such as logging in, authenticating, selecting "status", then selecting "edit", then typing in the status text, and then clicking "post".

API often are "published" or made known to other programmers using a syntax which includes mandatory or required arguments and optional arguments. Some APIs are "exposed" to other programs so that other programs may discover their existence and make use of their offered functionality. Most API are also dependent on operating system (OS) details, so an API for a database program running on a first OS may be different than the API for the same database program running on a second OS. Similarly, different revisions of the same program product may have different APIs, because new features may require the addition of mandatory or optional arguments in order to exercise those features.

Some APIs conform to open or consortium-developed "standards". Such APIs allow programs developed by different suppliers to interoperate with a high degree of certainty that the interface will be successful. However, historically, such standardized API only encompass a least common denominator of features and functions, and often do not include any feature or functions which are unique or specific to just one vendor's product. It is in these different functions that the vendors provide competitive product features, so many products offer both standardized and "extended" APIs, where the unique functions are requested via the extensions to the standardized API. As a result, if programmers of a new product which their program to be independent and compatible with all suppliers of a particular program type, such as databases, they will restrict themselves from using any non-standard API extensions, but this has a cost in that they are unable to use any of the sometimes very effective proprietary functions of some of the available products.

Still other API are entirely proprietary, and sometimes are confidential or secret in nature. For example, in order to write programs which will interface to certain high-value target programs, such as stock trading systems, the programmer must first obtain permission from the API owner to get the details of the proprietary API, which usually involves some degree of certification of the API user as a non-threat and a non-disclosure agreement to maintain the confidence of the API.

For programmers, the result is a landscape of proprietary, standardized, and extended API for software developers to use, which will accelerate their time-to-market by leveraging existing program functionality from other programs and remote services. As the API are constantly updated, revised, and created, programmers face a considerable challenge to remain aware of the most recent versions of each API.

For users, the problem is similar to that of the programmers, in which a user may become frustrated trying to figure out how to accomplish similar, simple tasks (e.g., status update, balance inquiry, etc.) on multiple online services, each of which has a different user interface sequence to accomplish the same operation. Even after learning these sequences, the user may be frustrated by the smallest of changes or updates to the user interfaces. Thus, tools to integrate or provide a "dashboard" into multiple online services of the same type, such as a social networking dashboard or a financial management tools dashboard, are becoming popular, which abstract the user from needing to know all the specifics of each online account to accomplish the same actions.

SUMMARY OF THE INVENTION

Users of online services may avoid having to gain knowledge of the intricacies of specific Application Programming Interface (API) syntaxes and elements by instead using natural language (NL) requests which are processed to extract NL components of the request. The NL components are then used to find one or more matches of known APIs, and then at least one structured API call is constructed by mapping the request's NL components to the structured API call's elements (e.g., arguments, parameters, etc.). The system can then invoke the online service on behalf of the client, and return the results to the client, or it can return the constructed structured API call to the client. The known API elements can be initialized and updated by ingesting the description documents for the structured APIs, and then using natural language processing (NLP) to extract optional and required API elements from the descriptions, which can then be utilized in the matching process to further enhance the results of the system.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF
EMBODIMENT(S) OF THE INVENTION

Problems Recognized

The present inventors have recognized a problem in the art which they believe is as-of-yet unrecognized by those skilled in the art, and unsolved. Web-based Application Programming Interfaces (APIs) allow the transfer of remote resources across the web. Web-based APIs have evolved significantly over time. In the early days of the Internet, APIs based on Simple Object Access Protocol (SOAP) and Web Services Description Language (WSDL) became a popular ways to exchange structured data between networked resources, such as between programs, servers, and services, especially in the enterprise computing space. These APIs were very verbose and highly structured, which burdens clients with rigid compliance requirements and processing power to work with SOAP and WSDL APIs.

A significant advancement in web-based APIs occurred more recently, called REpresentational State Transfer (REST). REST APIs favor simplicity via stateless transactions, allowing clients to perform stateless Hyper Text Transfer Protocol (HTTP) operations against simple Uniform Resource Locator (URL) endpoints to access remote networked computing resources. The data payload provided via the API is usually eXtensible Markup Language (XML) or JavaScript Object Notation™ (JSON). REST APIs quickly became and currently remain one of the most popular choices for transferring remote resources across the web.

For example, IBM Lotus Connections™ may expose (e.g., publish to other programs and systems) the following REST-based endpoints to access activities, profile information, and friends:

/connections/activities
/connections/profile
/connections/friends

These resources may be retrieved, created, updated, or deleted via standard HTTP GET, POST, PUT, or DELETE operations respectively.

While web-based APIs have improved in usability, the present inventors recognize that they still have an inherent complexity, wherein the developers must understand the API (usually by way of its documentation) in order to interact with it. URL endpoints are hard-coded into consumer code to be compliant with the documentation. This presents a problem recognized by the inventors because application programs become locked-in to a specific structured API, such that their developed code is "married" to the hard-coded APIs of the web resources it needs to use. To interact with the Connections API above, for example, a programmer would need to understand the syntax of each URL endpoint, the expected headers and parameters, and the payload format and custom-build compliant code.

As previously mentioned, standardized APIs allowing greater portability of applications, but standards can take years to develop and a lot of industry cooperation, and they typically leave out unique functionality available only from one source. As a result, service providers often just develop their own custom API, even if other service providers have substantially similar concepts (e.g., both Google+™ and Facebook™ have news feeds, but their APIs are very different).

As such, the present inventors recognized that even the most advanced web APIs remain difficult and challenging for programmers to use effectively, and to keep their products up-to-date with the evolving APIs of the web resources on which their products rely or with which their products interact.

Therefore, at least one object of the present invention is to provide a highly unstructured API via natural language to programmers, which would then be translated to one or more structured APIs without requiring the program designers to familiarize or become experts with each of the targeted structured APIs.

For the purposes of the present disclosure, we will refer to service endpoints as the service which is invoked by execution of an API call. And, we will refer to the required and optional parameters, arguments, pointers, etc., of the API collectively as "elements" of the API. For example, one particular type of API call is a Hyper Text Transfer Protocol (HTTP) signature. An HTTP signature includes one or more elements, such as URL, headers, body, etc. Specific examples will be provided in the following paragraphs.

Review of the Available Technologies

In a search for available technologies to address this continuing challenge for software developers, the present inventors found several existing technologies which fell short of the need in one or more ways. The following review of the existing art reflects the inventors' best understanding of it, and should not be considered an exhaustive consideration of all technologies.

U.S. Pat. No. 7,849,048 to Justin Langseth, et al, entitled "System and Method of Making Unstructured Data available to Structured data Analysis Tools" provides the opposite transformation as sought by the present inventors.

U.S. Pat. No. 7,962,470 to Marko Degenkolb, et al, entitled "System and Method for Searching Web Services" discloses an invention for searching remote services by analyzing universal descriptors of such services. It does not appear, however, to describe exposing or interacting with these services via natural language queries. In other words, searching for available web resources does not alleviate the complexities, and the required expertise thereof, of the APIs of the located services.

United States pre-grant published patent application 2007/0299127 A1 to Matthias Kaiser, et al, entitled "Systems and Methods for Processing Natural Language Queries" described in an general sense systems for understanding and acting on natural language queries (NLQ), but it does not suggest or disclose how to relate those NLQs to structured API usages.

United States pre-grant published patent application 2007/0203893 to Anthony Seth Krinsky, et al, entitled "Apparatus and Method for Federated Querying of Unstructured Data" discloses how a request may be mapped to unstructured data, wherein the unstructured results are used to formulate a structured query to a data store. Krinsky, however, employs a considerably different approach than the present invention, as will become evident in the following paragraphs.

And, United States pre-grant published patent application 2006/0053133 to David J. Parkinson entitled "System and Method for Parsing Unstructured Data into Structured Data" also employs a significantly different approach and method than the present invention.

Processing of Natural Language Queries in General

The present inventors sought to define a new method and process that would allow use of natural language queries (NLQs) as a highly unstructured interface to access highly structured APIs. In order to "understand" a user's intent expressed in a natural language query (NLQ), Natural Language analysis (or processing or parsing) (NLP) can be employed.

According to at least one aspect of the present invention, a new NLQ may be compared to other previously-processed NLQ's to find and infer similarities between them. For example, a newly-received NLQ of "find current household income census data for persons living in Texas" may be found to have a high degree of similarity with a previously-handled natural language request "2010 census database with data by state and by household". If the latter phrase has previously been converted to a structured API call, then there is a high degree of confidence in converting the former phrase into the same structured API call.

A useful publicly-available document regarding realization of a general purpose automatic Natural Language processor is described in "Deep Semantic Analysis of Text" by James F. Allen, et al., of the University of Rochester and the Institute for Human and Machine Cognition (document W08-0227 from the ACL). One approach to advancing beyond keyword searching is "intent-centric" processing as proposed by Scott Brave, et al., in WIPO patent application WO 2009/021198 A1. The present inventors do not believe this approach, however solves the presently addressed problem, as will be evident by the following paragraphs.

The present invention is set forth in at least one exemplary embodiment as an application of or manner of using a Natural Language analyzer platform, sometimes also referred to as NLP parsing. This platform may be a system such as the IBM Watson™ system, such as is described in "Building Watson: An Overview of the DeepQA Project" (Stanford University online, and AI Magazine, Fall 2010 issue). Another useful, publicly-available teaching regarding the availability of NLP analyzers which may be suitable for adapting and improving to the present invention may include those described by Konstantin Zuev in United States Pre-Grant Published Patent Application 2011/0270607 A1 (Nov. 3, 2011); the Thompson's Motif-Index Literature system of Thiery Declerk, et al., as published in "Research and Advanced Technology for Digital Libraries: Lecture Notes in Computer Science", vol. 6966, 2011, pp. 151-158; and such as that described by Sala Ait-Mokhtar, et al., in U.S. Pat. No. 7,058,567 (Jun. 6, 2006).

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

For the purposes of this disclosure, we will refer to the key words and phrases in a natural language request which are identified by natural language processing as "components" of the request. Further, when deep semantic analysis reveals relationships between components, such relationships will also be components. For example, the NL request "give me all my new messages" would be parsed by NLP into three components "give", "me", and "all new messages". And, relationships of "give < > to me" and "give < > all new messages" would also be resulting components determined by NLP.

A First Exemplary Embodiment

In one available embodiment, a client device (e.g., a consumer's cellphone, tablet computer, desktop computer) needs to access one or more resources (e.g., social media activities, unread messages, news postings, friend requests, etc.) from one or more endpoint service providers. Rather than complying with multiple structured APIs to request the resource(s), the user of the client device formulates a request for the resource in an unstructured natural language expression. The client device then sends the unstructured NL query to the service provider's central API endpoint. The service provider system, using an embodiment of the present invention, parses the unstructured query according to natural language processing to extract the query's components, maps the components to its own structured API elements, executes the API call with the populated elements, finally returning an appropriate response, often structured data, to the requesting client. If the results of the NLP parsing is inconclusive or ambiguous, such that more than one API call perhaps would meet the inferred desire of the NL query, then one or more additional clarification processes may be performed, including using one or more interrogatory interfaces (e.g., pop-up menus, text messages, check lists, radio buttons, etc.) to a user, brokering for an API using other criteria (explained in following paragraphs), or using additional transactions transparently to the user.

Figure 1:
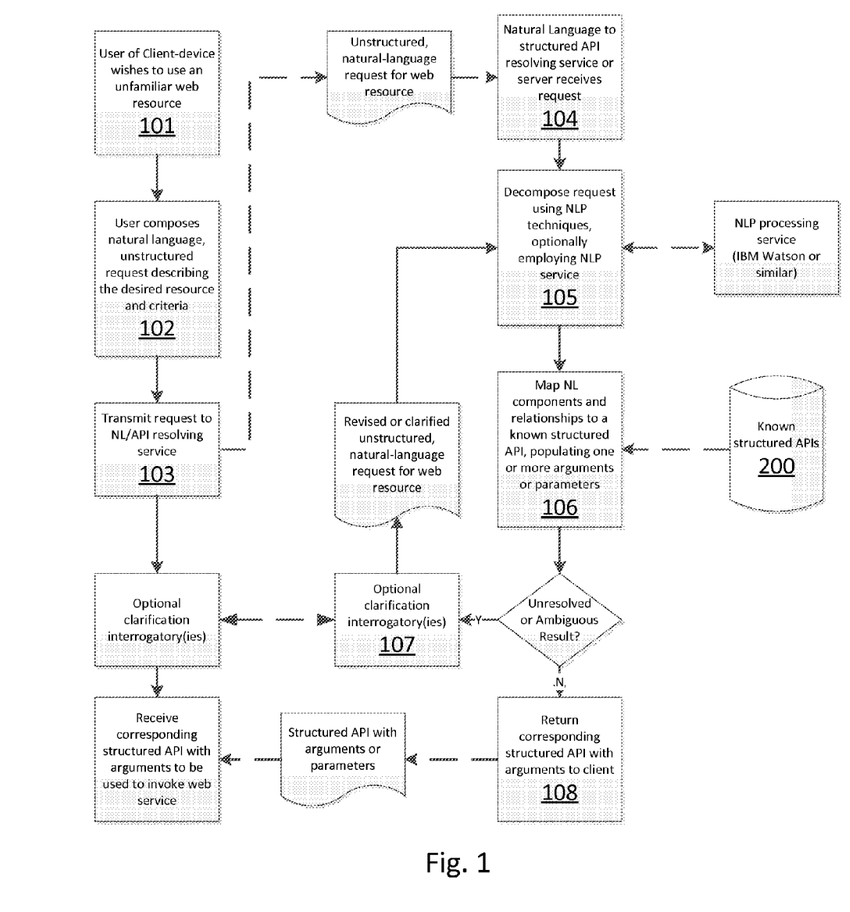
FIG. 1 illustrates a logical process according to the invention for resolving an unstructured natural language user request into a structured API call.

Turning now to FIG. 1, such a process is illustrated:

Step 101. A client device user wants to access a resource (e.g. status updates, new messages, latest news feed entries, etc.) at an endpoint service.

Step 102. The client device user (or a process running on the client device) composes an unstructured query in natural language describing desired resource. The client device user may construct query however he, she (or it in the case of a program being the client user) desires, without regard to API standards, syntax or structure.

Step 103. The client device sends the unstructured query to an Natural Language Query/API (NLQ/API) resolving service, such as sending to a central URL at the remote endpoint, for example:
 a. using a standard HTTP POST operation;
 b. in which the payload may simply be string with unstructured query; and
 c. optionally may also send the query in parameter, headers, or other HTTP operations.

d. Alternatively, the client device may send the NL query to a non-descript destination, and the server at the destination may detect that it is an unstructured request (e.g. not compliant as an API call), and divert the NLQ to an embodiment of the NLQ/API invention.

Step 104. The NLQ/API resolving service, or the endpoint service provider as the case may be, receives unstructured query from client.

Step 105. The NLQ/API service decomposes client's unstructured query into semantic NL components using natural processing, such as those functions available by an IBM Watson system or a similar system.

Step 106. Based on semantic relationships, parts of speech, keywords, etc, NL components are identified in the NLQ, and the NLQ/API service maps the query and its components to one of its structured APIs and its elements.

a. The NLQ/API service may map the query to another endpoint service, enabling both unstructured and traditional APIs to be used in conjunction.
  b. For example, natural language query "give me my activities over the last day" may be decomposed to NL components "my activities" and "last day", and then mapped to structured API "/connections/activities?timeframe=today", where "/connections" is the endpoint selected, "activities" is an API element, and "timeframe=today" is an API element.
  c. The mapping operations may be performed automatically, as disclosed in more details in the following paragraphs, which includes in at least one embodiment building a library of known structured APIs by optionally ingesting API documentation.

Step 107. If necessary, the NLP/API service may request additional details from the requesting client to clarify the unstructured query. Clarification of ambiguous or incomplete queries is described in more detail in the following paragraphs. Or, the NLQ/API service may simply return an error describing the problem, which likely would result in the requesting client rephrasing the query and re-submitting it.

Step 108. After mapping the components of the unstructured query to a selected API and its elements to access the desired resource, the NLQ/API service returns the requested constructed API with value-populated elements to the requesting client for it to use. Subsequently, the client may store the constructed API call for repeat use (e.g., cached), or it may use it once and discard it after completion.

Here is a more detailed example of operation of this embodiment. Presume that a particular product or platform, such as the IBM Lotus Connections™ social software platform, may expose the following REST operations pertaining to a user's activities, in which each operation requires a well-formed (inflexible and structured) HTTP signature to use (e.g. REST HTTP signatures are the selected, structured API targeted in this example):

a. HTTP GET /connections/activities
  b. HTTP GET /connections/activities/1234
  c. HTTP POST /connections/activities {"This is my status post!"}
  d. HTTP PUT /connections/activities/1234 {"I am changing my previous status!"}
  e. HTTP DELETE /connections/activities/1234

These REST API calls will get all activities, get a specific activity by identification (ID), create a new activity, update an activity, and delete an activity, respectively. Without benefit of an embodiment of the present invention, programmers are expected to learn and hardcode logic for each of these REST operations. With benefit of an embodiment of the invention, programmers are free to work with Lotus Connections Activities with flexibility and consistency in a natural language format, wherein phrases will be mapped (→) such as the following examples:

a. "Give me my activities"→HTTP POST /connections/watson
  b. "Give me my activity with id of 1234"→ HTTP POST /connections/watson
  c. "Post a status update of 'This is my status post!'"→ HTTP POST /connections/watson
  d. "Update my status post with id of 1234 with 'I am changing my previous status!'"→HTTP POST /connections/watson
  e. "Delete my activity with id of 1234"→HTTP POST /connections/watson From this example, one can see some distinct advantages of using embodiments of this invention over anything that exists today:

1. Client devices are free to formulate a query for a resource however they want to using natural language; this means no need for standards across vendors or service providers.
  2. The service provider's REST API may change on the back-end, but client's queries will remain valid. There's no need for clients to update their applications as new API versions are released.
  3. Simplicity; developers do not need to spend hours reading syntax details of a service provider's documentation. They're free to interact with resources they want with easily understood natural language queries.
  4. Natural Language Processing Systems, such as IBM's Watson™ platform, may be used to provide this natural language functionality to service providers.

Here is another detailed example of operation of this embodiment. A user's cellphone needs to retrieve the latest activities in a news feed from multiple social media platforms such as Facebook™, Google+™, and Twitter™ on the user's behalf. Presuming that the client device is previously identified and previously authenticated, the user's cellphone issues a query in natural language to each of these remote services such as "Give me the latest activities" using an unstructured request to an NLQ/API service according to the present invention, such as:

HTTP POST /facebook/watson/, Payload: "Give me the latest activities"

HTTP POST /google/watson/, Payload: "Give me the latest activities"

HTTP POST /twitter/watson/, Payload "Give me the latest activities"

Here, the natural language processor would identify the NL components of the NL request as:

(a) "give" (e.g., retrieve, download, GET, etc.),
  (b) "me" (to the requesting client device), and
  (c) "latest activities" (e.g., updates, unread messages, newest postings, recent news entries, etc.).

Shown symantically, the request would be parsed as follows:

<give><me>the<latest activities>=<a><b>the<c>=<retrieve+download+get><updates+unread_msgs+ ... >

These potential synonyms for the NL components of the NL request are then used to search for known APIs which include these operations and/or elements.

Each social media service receives the unstructured query and maps it to its own proprietary REST API, as previously described. Subsequently, each service responds by transmitting or downloading the user's most recent activities to the cell phone, following which the user's phone may consolidate and render them in a central notification center or on another user interface. Contrasting this with how such functionality must be performed today, in which the cellphone's Operating System is hardcoded to interact specifically with the three structured social media platform APIs, and in which the operating system must be maintained to stay up-to-date with changes to each service provider's API, one can readily see the advantage of the embodiments of the present invention.

Additional Exemplary Embodiments

In another embodiment, a human user may directly issue queries to a remote endpoint server in natural language. When the endpoint returns the requested resource, the user's device may render it in some appropriate way.

In yet another embodiment, service platforms can be slightly modified to receive unstructured natural language requests and queries, and upon detection of such, could forward the requests and queries to a third-party NLQ/API resolution service, which would then convert it to a structured API compliant with that of the service platform on behalf of the service platform. In this manner, open or standardized APIs could be easily supported by centralized implementation, as well as proprietary APIs could be kept more secure whereas only the third-party resolution service would be required to "know" the proprietary APIs.

Mapping Unstructured Requests to Structured Requests

As previously mentioned, one step or process within some embodiments of the present invention is to map (106) the NL components of the unstructured request to elements of a known structured API call (200), where the NL components are extracted from the unstructured request and their relationships to the each other and the request have been detected by natural language processing.

Maps of NL components to structured APIs can be created manually for the purposes of some embodiments of the invention. Indeed, some service providers are likely to map unstructured request components to elements of conventional, structured APIs. This will facilitate backwards compatibility with existing structured APIs, leverage years of experience in building APIs, and provide clients with two alternative choices for interacting with the service provider. While this approach may be useful for the limited scenario of initial deployment, it is not anticipated to be optimal for on-going incorporation of new APIs and revisions to existing APIs.

Therefore, an optional aspect of some embodiments of the present invention is a method of mapping unstructured requests to structured API endpoints by correlating natural language descriptions of each API operation with its API elements (e.g., arguments, parameters, options, etc.), such as an HTTP signature with elements of URL, headers, parameters, message body, encoding, etc. In essence, a natural language processing system, such as IBM's Watson system, can be employed to "learn" each new or revised structured API via the natural language documentation which is intended for human programmers to read and reference. This automatic learning of API functionality and elements will facilitate automatic creation of structured API calls when unstructured requests are received, while avoiding or reducing manual effort to create the NL component to API element maps. This aspect of the present invention will enable unstructured requests to be mapped to a structured API calls automatically, meaning less code to build and maintain and affording flexibility for the structured API to change. With an embodiment equipped to learn structured APIs from API documentation, the documentation can be automatically ingested by a natural language deep semantic analysis system to find structured API functionality definitions, and to associate their API elements (e.g., arguments, parameters, options, etc.) with their functional descriptions expressed in natural language text. Then, when a new unstructured request is received, the NL components in the unstructured request can be correlated to the NL descriptions of the API elements as found in the API documentation. Highly-correlated API elements would be declared as probable matches to the components of the NL components of the unstructured request, and then that particular structured API would be selected (or offered) and constructed with the elements to be returned to the client.

Figure 2:
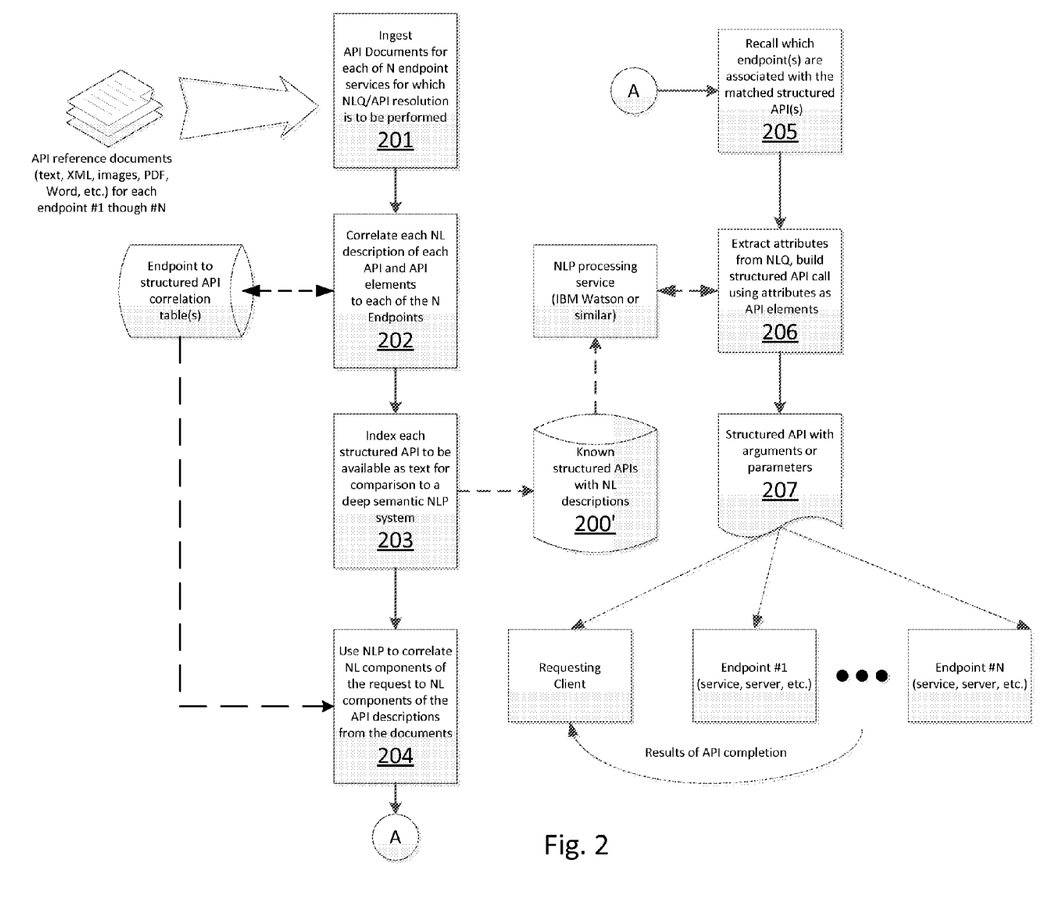
FIG. 2 sets forth a logical process for training a database of structured APIs from natural language documentation regarding those APIs, and for using those natural language documents as a guide to selecting a structured API to fulfill a user's unstructured natural language service request.

In such an embodiment according to this aspect of the present invention, the NLQ/API resolving system "learns" the service provider's API documentation, such that each API endpoint is documented in natural language and has a defined set of required and optional API elements, such as an HTTP signature. The system then receives unstructured requests from clients. The system maps client's unstructured requests to natural language descriptions of API operations in the API's documentation. The system then optionally constructs and executes an appropriate structured API call, such as an HTTP request with corresponding elements, which complies with the API's documentation requirements on behalf of the client, or it returns the constructed structured API to the requesting client for its own use or storage. In the former arrangement, results from executing the request on behalf of the requesting client are returned to the client. For example, turning to FIG. 2:

Step 201. The NLQ/API system ingests service provider's REST API documentation.

Step 202. The NLQ/API system correlates the natural language description from the documentation of the service provider's REST API operations with the API elements (URL endpoints, headers, parameters, payload formats, etc.).

Step 203. The NLQ/API system indexes the REST API documentation to make it a viable evidence database to be added of the NLP deep QA corpus for subsequent searching, such as is used in IBM Watson™.

Step 204. After the NLQ/API system has received a natural language unstructured request for use of an endpoint from a requesting client, in which the client's request contains natural language description of resource being requested (e.g., "Give me my latest activities from today"), the NLQ/API system utilizes a method such as that shown in FIG. 1a or FIG. 1b to map the NL components in the request to natural language description(s) (200') from the API documentation to identify a matching REST operation.

a. Both the NL request and the NL documentation may be decomposed and annotated with semantic relationships, concepts, keywords, etc.

b. These annotations in the unstructured request and the—API documentation may then be compared to find a high-confidence match between the requested functionality and the available, known structured APIs.

c. Deep semantic NLP systems, such as IBM Watson™, are capable of making these NL-based matches, e.g., matching two sets of natural language expressions based on a series of annotators, scorers, AI, etc.

Step 205. Based on initial processing of the structured API documentation, the NLQ/API system recalls the API elements (e.g., URL endpoint, HTTP operation, headers, parameters, payload format, etc.) for the target structured API operation.

Step 206. Based on the requirements of the structured API operation, the NLQ/API system extracts these attributes from the NL components of the requesting client's natural language request.
  a. If any required attributes are missing, the NLQ/API system may return an error describing the problem to the requesting client.
  b. Alternatively, the NLQ/API system may request these missing attributes from the requesting client by means of a state-full conversation with the client.
  c. Still alternatively, if required attributes are missing, the NLQ/API system may automatically populate attributes based on pre-programmed "intuition".
    (1) For example, a certain REST API may require a timeframe when retrieving a user's activity news feed.
    (2) If the requesting client does not supply a timeframe, the NLQ/API system may supply an "intuitive" default value into a required API element, such as "today".
    (3) Intuitive default values may be derived from the ingested and NL-processed -API documentation, for example.
  d. The NLQ/API resolving system constructs a structured API call including required an optional elements (parameters, arguments, etc.) populated with values corresponding to the extracted attributes that comply with the API's documentation.

Step 207. The NLQ/API system optionally submits the constructed API callon behalf of the requesting client to the identified endpoint, or it may return the constructed API (with populated element values) to the requesting client.
  a. If the constructed API call is submitted to the identified endpoint on behalf of the client, the NLQ/API system the receives the service's results from the execution of the API call, and it then forwards those results to the client.
  b. If the constructed API call (with populated element values) is returned to the requesting client, then the client can submit it to the identified endpoint and receive the results directly from the invoked service, or the client may store the constructed API call for later use.

The present inventors envision at least one embodiment that primarily uses or places higher priority on REST API operations above other types of APIs (proprietary, SOAP, WSDL, etc.).

Advanced API Brokering

While the embodiment features and aspects set forth in the previous paragraphs provide very useful improvements over the prior art, there are further advanced optional embodiment features which we now describe in detail. These will be especially useful for integrator social tools, such as tools which attempt to provide a user with a single view and control of multiple social accounts such as Google+™, FaceBook™, Lotus Connections™, Twitter™, Instagram™, Pinterest™, LinkedIn™, Plaxo™, Focus™, Netparty™, Ryze™, Talkbiznow™, and Xing™. However, embodiments and methods of usage of embodiments of the invention are not limited to social networking platforms, but may also be useful for providing users with meta-agents that integrate other types of accounts, such as online banking accounts, online financial trading accounts, online news accounts and feeds, online class and training accounts, etc In each of these types or classes of online services, there are similar user desires which can be expressed in natural language the same way for each species of the class, but in which each species requires a specific structured API which may not be compatible with other species in the class.

So, a further object of these advanced embodiments according to the present invention is to use natural language as much as possible to interact with any service, group of services, or set of service features available to a user. The advanced features aim to provide a smarter API broker which selects one of multiple available structured APIs according to the user's context and user's profile to be more intelligent and intuitive when brokering a natural language, unstructured API service request.

The advancement utilizes the user's profile, the context of the request, and a record of historical actions to choose an API (e.g., broker an API) in response to an otherwise ambiguous natural language request to an underlying API service providing the right service calls based on the user's data.

The Unstructured API broker receives a user's profile information, context of the request, and a log of historical actions when being prompted to broker an API resolving request. The broker analyzes the question and finds the goal and key terms in natural language text, and finds similar goals and terms within the users profile and historical actions. The broker then queries to find services that match that goal and terms, and subsequently it finds the appropriate service that matches the specific user's interests corresponding to the user's profile, or historical data, or context of the request, or a combination of profile, history and context. A structured API call is then constructed for the selected service, according to the processes described in the previous paragraphs, and optionally the constructed API call is invoked by the NLQ/API system on behalf of the requesting client, or the constructed API call is returned to the requesting client.

Figure 3:
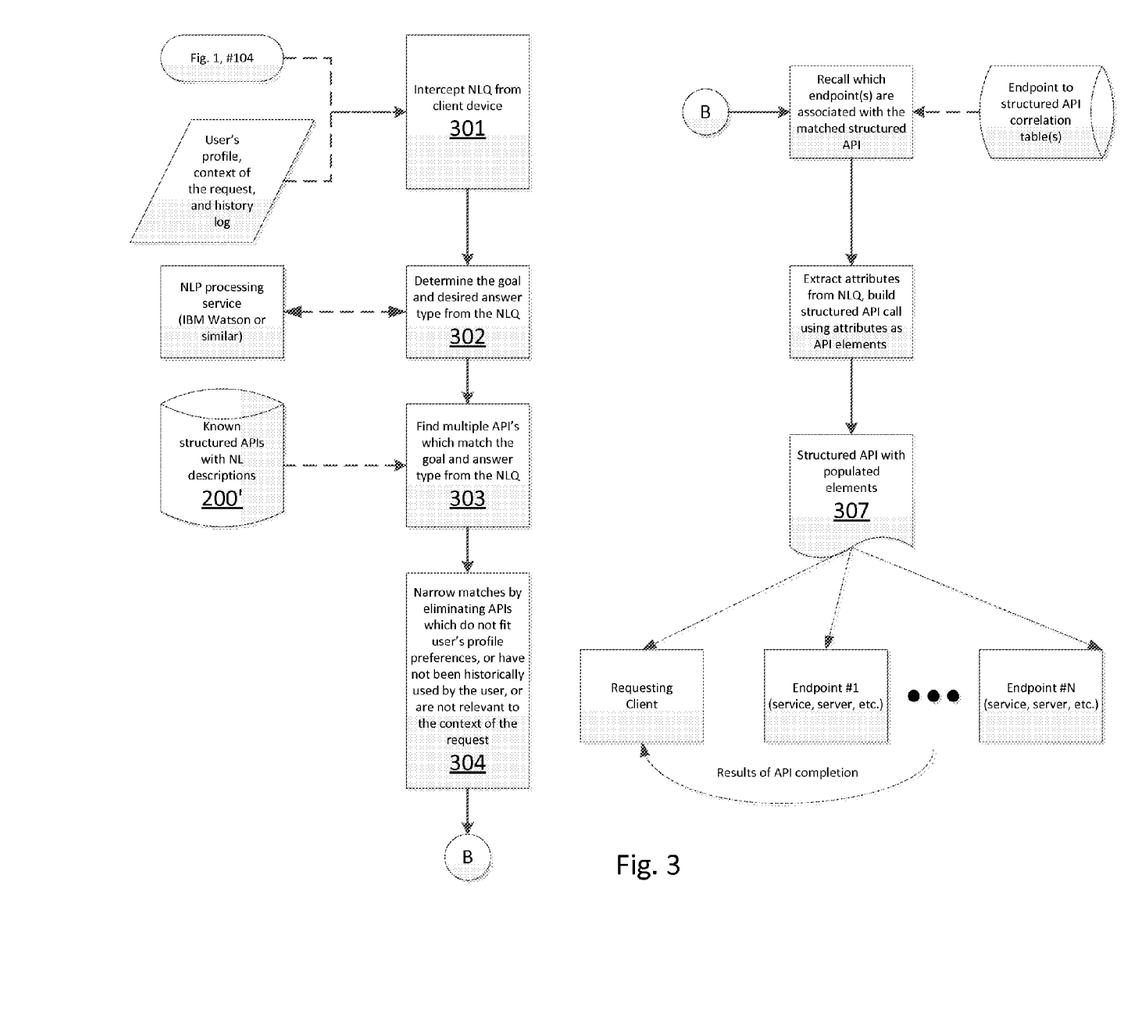
FIG. 3 depicts a brokering logical process for selecting an optimal structured API (and the service it invokes) from a plurality of structured APIs which ambiguously match the user's natural language request.

Turning to FIG. 3, responsive to a requesting client (e.g., a user—or another computer-executed process)—an endpoint service in natural language:
  Step 301. The request for the endpoint service is forwarded to or intercepted by the API broker system, including, optionally, one or more of the context of the request, the user's profile information, and available historical data.
  Step 302. The API broker system analyzes the request for the requester's implicit goal and desired answer type.
  Step 303. The API broker system then analyzes known APIs that describe or provide such services which would meet the requester's goal and/or answer types.
  Step 304. The API broker system then narrows those possible matches to only services that match the users profile information, historical records (e.g., historical posts, historical data received, the last action performed by the user, etc.), and/or the context of the request (the user is actively using a calendar application, or the user is actively searching for travel arrangements, etc.).
  Step 307. The endpoint service that more closely aligns by a match of the terms from the user information and recent historical information is invoked via a constructed API call, and then results returned to the requesting client in the manners described in the foregoing paragraphs.

Computer Program Product

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the Suitable Computing Platform The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 4:
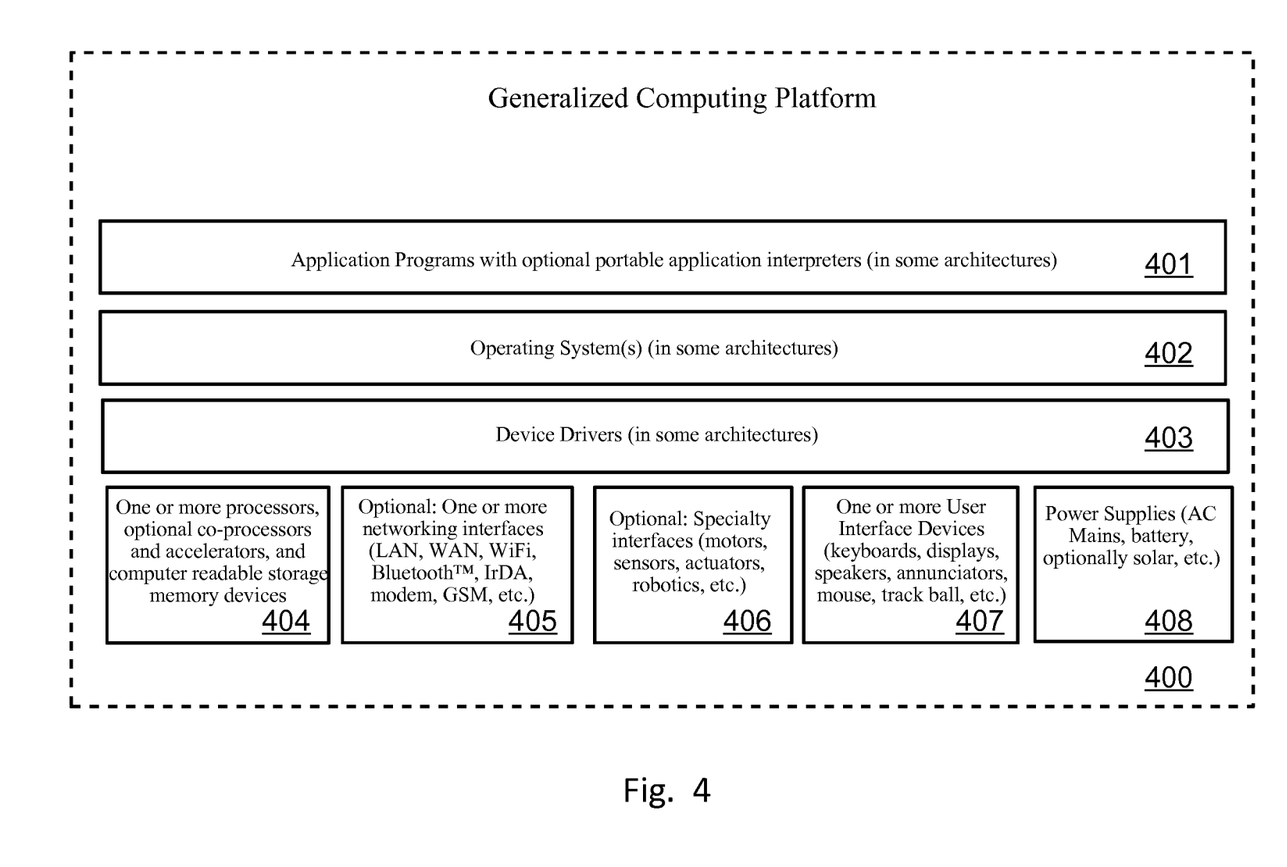
FIG. 4 illustrates a generalized computing platform suitable for combination with program instructions to perform a logical process such as shown in FIG. 3 to yield a computer system embodiment according to the present invention.

The present invention may be realized for many different processors used in many different computing platforms. FIG. 4 illustrates a generalized computing platform (400), such as common and well-known computing platforms such as "Personal Computers", web servers such as an IBM iSeries™ server, and portable devices such as personal digital assistants and smart phones, running a popular operating systems (402) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (401) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (404) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (405) may be provided, as well as specialty interfaces for specific applications. If the computing platform is intended to interact with human users, it is provided with one or more user interface devices (407), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for handling a user request for invoking a computer service through an Application Programming Interface, comprising:
    performing a first natural language (NL) analysis by a computer on one or more computer service user programming documents, wherein API user documents describe in structured natural language one or more structured Application Programming Interfaces (APIs) with one or more API elements, and wherein each API element corresponds to a parameter or argument to use or invoke the computer service;
    extracting by a computer the one or more API elements from a user programming document according to the first NL analysis;
    performing a second NL analysis by the computer on an unstructured request from a client to use or invoke the computer service, the unstructured request comprising natural language containing one or more request components;
    matching by the computer the one or more request components to the one or more API elements;
    constructing by the computer a structured API call using the matching request components for API elements; and
    performing by the computer one or more operations selected from the group consisting of submitting the constructed structured API call to the computer service on behalf of the client, returning the constructed structured API call to the requesting client, and returning a result from an invoked corresponding computer service to the requesting client.

2. The method as set forth in claim 1 wherein the constructing of a structured API call further comprises constructing a Hyper Text Transfer Protocol signature.

3. The method as set forth in claim 1 further comprising, responsive to detecting by the computer that a plurality of APIs match the request components, providing by the computer an interrogatory with the requesting client to obtain further information regarding the unstructured request, and repeating the steps of performing natural language analysis on the unstructured request, extracting request components, mapping request components to API elements, constructing the structured API call, and performing one or more operations.

4. The method as set forth in claim 1 further comprising, responsive to detecting by the computer that a plurality of APIs match the request components, brokering for a structured API by the computer by eliminating one or more matching structured APIs to disqualify one or more APIs according to one or more additional criteria selected from the group consisting of a user profile, a user history of operations, and a context associated with the unstructured request.

5. The method as set forth in claim 1 wherein the requesting client comprises a user interface to a user of a client device.

6. A computer program product for handling a user request for invoking a computer service comprising:
    a computer-readable, memory storage device; and
    one or more computer program instructions embodied by the computer-readable, memory storage device, for causing a computer processor upon execution to perform operations comprising:

performing a first natural language (NL) analysis on one or more computer service user programming documents, wherein API user documents describe in structured natural language one or more structured Application Programming Interfaces (APIs) with one or more API elements, and wherein each API element corresponds to a parameter or argument to use or invoke the computer service;

extracting the one or more API elements from a user programming document according to the first NL analysis;

performing a second NL analysis on an unstructured request from a client to use or invoke the computer service, the unstructured request comprising natural language containing one or more request components;

matching the one or more request components to the one or more API elements;

constructing a structured API call using the matching request components for API elements; and performing one or more operations selected from the group consisting of submitting the constructed structured API call to the computer service on behalf of the client, returning the constructed structured API call to the requesting client, and returning a result from an invoked corresponding computer service to the requesting client.

7. The computer program product as set forth in claim 6 wherein the constructing of a structured API call further comprises constructing a Hyper Text Transfer Protocol signature.

8. The computer program product as set forth in claim 6 wherein the computer program instructions further comprise computer program instruction for, responsive to detecting by a computer that a plurality of APIs match the request components, providing an interrogatory with the client to obtain further information regarding the unstructured request, and for repeating the steps of performing the second natural language analysis on the unstructured request, extracting request components, matching request components to API elements, constructing the structured API call, and performing the one or more operations.

9. The computer program product as set forth in claim 6 wherein the computer program instructions further comprise computer program instruction for, responsive to detecting by a computer that a plurality of APIs match the request components, brokering for a structured API by a computer by eliminating one or more matching structured APIs to disqualify one or more APIs according to one or more additional criteria selected from the group consisting of a user profile, a user history of operations, and a context associated with the unstructured request.

10. The computer program product as set forth in claim 6 wherein the requesting client comprises a user interface to a user of a client device.

11. A system for handling a user request for invoking a computer service comprising:

a computer processor;

a computer-readable, memory storage device; and one or more computer program instructions embodied by the computer-readable, memory storage device, for causing the computer processor upon execution to perform operations comprising:

performing a first natural language (NL) analysis on one or more computer service user programming documents, wherein API user documents describe in structured natural language one or more structured Application Programming Interfaces (APIs) with one or more API elements, and wherein each API element corresponds to a parameter or argument to use or invoke the computer service;

extracting the one or more API elements from a user programming document according to the first NL analysis;

performing a second NL analysis on an unstructured request from a client to use or invoke the computer service, the unstructured request comprising natural language containing one or more request components;

matching the one or more request components to the one or more API elements;

constructing a structured API call using the matching request components for API elements; and performing one or more operations selected from the group consisting of submitting the constructed structured API call to the computer service on behalf of the client, returning the constructed structured API call to the requesting client, and returning a result from an invoked corresponding computer service to the requesting client.

12. The system as set forth in claim 11 wherein the constructing of a structured API call further comprises constructing a Hyper Text Transfer Protocol signature.

13. The system as set forth in claim 11 wherein the computer program instructions further comprise computer program instruction for, responsive to detecting by a computer that a plurality of APIs match the request components, providing an interrogatory with the client to obtain further information regarding the unstructured request, and for repeating the steps of performing the second natural language analysis on the unstructured request, extracting request components, matching request components to API elements, constructing the structured API call, and performing the one or more operations.

14. The system as set forth in claim 11 wherein the computer program instructions further comprise computer program instruction for, responsive to detecting by a computer that a plurality of APIs match the request components, brokering for a structured API by a computer by eliminating one or more matching structured APIs to disqualify one or more APIs according to one or more additional criteria selected from the group consisting of a user profile, a user history of operations, and a context associated with the unstructured request.

15. The system as set forth in claim 11 wherein the requesting client comprises a user interface to a user of a client device.

* * * * *